US012647672B2

(12) United States Patent
Sasaki et al.

(10) Patent No.: US 12,647,672 B2
(45) Date of Patent: Jun. 2, 2026

(54) IMAGING DEVICE AND IMAGE PROCESSING DEVICE IN WHICH A BLACKOUT FREE LIVE VIEW DISPLAY WITH A NATURAL APPEARANCE IS REALIZED

(71) Applicant: NIKON CORPORATION, Tokyo (JP)

(72) Inventors: Kazuhiro Sasaki, Nishitokyo (JP); Yuki Miura, Kawasaki (JP); Kazue Minagawa, Kawasaki (JP); Takeo Motohashi, Matsudo (JP)

(73) Assignee: NIKON CORPORATION, Tokyo (JP)

( * ) Notice: Subject to any disclaimer, the term of this patent is extended or adjusted under 35 U.S.C. 154(b) by 230 days.

(21) Appl. No.: 18/564,956

(22) PCT Filed: May 30, 2022

(86) PCT No.: PCT/JP2022/021993
§ 371 (c)(1),
(2) Date: Jun. 28, 2024

(87) PCT Pub. No.: WO2022/255318
PCT Pub. Date: Dec. 8, 2022

(65) Prior Publication Data
US 2025/0193511 A1 Jun. 12, 2025

(30) Foreign Application Priority Data
May 31, 2021 (JP) ................................. 2021-090956

(51) Int. Cl.
*H04N 23/63* (2023.01)
*H04N 7/01* (2006.01)
*H04N 23/667* (2023.01)

(52) U.S. Cl.
CPC ........... *H04N 23/63* (2023.01); *H04N 7/0127* (2013.01); *H04N 23/667* (2023.01)

(58) Field of Classification Search
CPC ...... H04N 23/60; H04N 23/63; H04N 23/667; H04N 23/73; H04N 7/0127
See application file for complete search history.

(56) References Cited

U.S. PATENT DOCUMENTS 10,547,792 B2 * 1/2020 Nagata ................... H04N 23/75
2011/0058085 A1 * 3/2011 Ito ........................ H04N 23/667
348/E5.022

(Continued)

FOREIGN PATENT DOCUMENTS

JP 2009141710 A * 6/2009
JP 2021019313 A * 2/2021
WO 2018/181124 A1 10/2018

OTHER PUBLICATIONS

Aug. 23, 2022 International Search Report issued in International Patent Application No. PCT/JP2022/021993.

*Primary Examiner* — Antoinette T Spinks
(74) *Attorney, Agent, or Firm* — Oliff PLC

(57) ABSTRACT

An imaging device includes: an imaging element configured to output a sequence of first frames at a first interval through first image capture, and output a second frame through an instruction for second image capture; a thinning unit configured to perform thinning of the sequence of first frames and outputs the thinned first frames at a second interval; and a control unit configured to control an output timing of the second frame on the basis of the first interval or the second interval and an instruction timing for the second image capture.

13 Claims, 12 Drawing Sheets

(56)　　　　　References Cited

U.S. PATENT DOCUMENTS

| | | | |
|---|---|---|---|
| 2012/0050580 A1* | 3/2012 | Iwasaki | H04N 23/64 |
| | | | 348/240.99 |
| 2012/0182455 A1* | 7/2012 | Gomi | H04N 25/531 |
| | | | 348/311 |
| 2017/0208237 A1* | 7/2017 | Nagata | G03B 15/03 |
| 2019/0238738 A1* | 8/2019 | Kunishige | H04N 23/73 |
| 2020/0012172 A1 | 1/2020 | Irie | |
| 2025/0287109 A1* | 9/2025 | Kuriki | H04N 23/71 |

* cited by examiner

IMAGING DEVICE AND IMAGE PROCESSING DEVICE IN WHICH A BLACKOUT FREE LIVE VIEW DISPLAY WITH A NATURAL APPEARANCE IS REALIZED

INCORPORATION BY REFERENCE

This application claims priority of Japanese Patent Application No. 2021-90956 filed on May 31, 2021, which is incorporated by reference in this application.

TECHNICAL FIELD

The present invention relates to an imaging device and an image processing device.

BACKGROUND ART

Recently, imaging devices and control methods for imaging devices have been known in which, when continuously capturing still images while moving the front curtain and rear curtain, the blackout period of a live view image can be shortened.

RELATED ART DOCUMENT

Patent Document

Patent Document 1: WO 2018/181124.

SUMMARY OF THE INVENTION

A disclosure of the imaging device comprises: an imaging element configured to output a sequence of first frames at a first interval through first image capture, and output a second frame through an instruction for second image capture; a thinning unit configured to perform thinning of the sequence of first frames and outputs the thinned first frames at a second interval; and a control unit configured to control an output timing of the second frame on the basis of the first interval or the second interval and an instruction timing for the second image capture.

Another disclosure of the imaging device comprises: an imaging element configured to output a sequence of first frames at a first interval through first image capture, and output a second frame through an instruction for second image capture; a generation unit configured to generate a third frame by thinning the second frame; and a data processing unit configured to control an output timing of the third frame generated by the generation unit at a timing in which the first frames are not outputted at the first interval due to the instruction for the second image capture.

A disclosure of the image processing device is configured to be able to connect to an imaging element configured to output a sequence of first frames at a first interval through first image capture, and output a second frame through an instruction for second image capture, the image processing device comprises: a thinning unit configured to perform thinning of the sequence of first frames and outputs the thinned first frames at a second interval; and a control unit configured to control an output timing of the second frame on the basis of the first interval or the second interval and an instruction timing for the second image capture.

Another disclosure of the image processing device is configured to be able to connect to an imaging element configured to output a sequence of first frames at a first interval through first image capture, and output a second frame through an instruction for second image capture, the image processing device comprises: a generation unit configured to generate a third frame by thinning the second frame; and a data processing unit configured to control an output timing of the third frame generated by the generation unit at a timing in which the first frames are not outputted at the first interval due to the instruction for the second image capture.

DETAILED DESCRIPTION OF EMBODIMENTS

In the embodiments below, an example will be described in which a blackout-free live view display with a natural appearance is realized using an imaging element that can perform so-called dual pipeline processing. A blackout is the momentary appearance of a black image over the entire screen of a display unit (rear monitor and electronic viewfinder) of an imaging device while capturing a still image.

Embodiment 1

<Configuration Example of Imaging Device>

Figure 1:
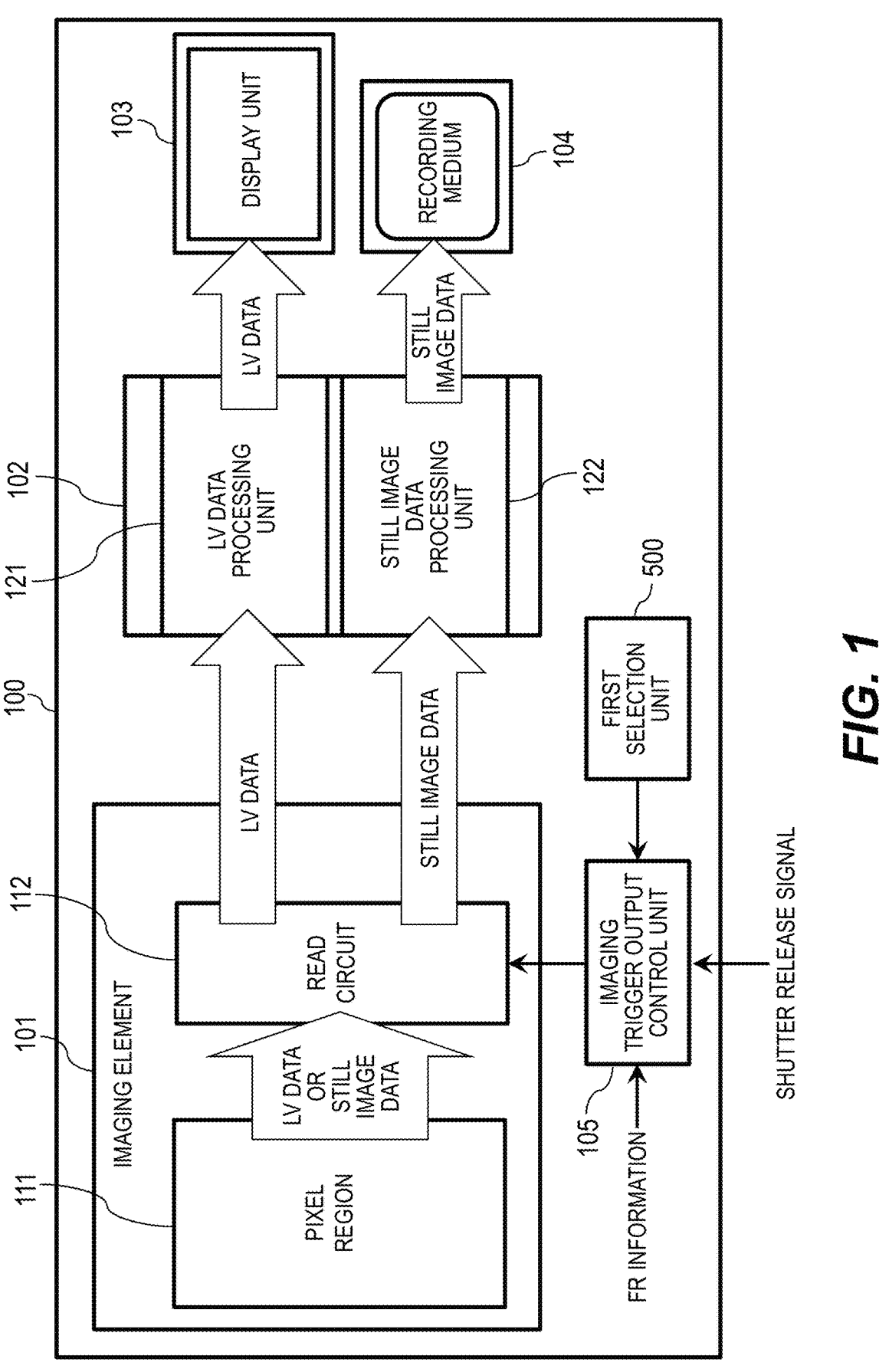
FIG. 1 is a block diagram showing a configuration example of an imaging device according to Embodiment 1.

FIG. 1 is a block diagram showing a configuration example of an imaging device according to Embodiment 1. The imaging device 100 includes an imaging element 101, an image processing unit 102, a display unit 103, a recording medium 104, and an imaging trigger output control unit 105. The imaging element 101 has a pixel region 111 and a read circuit 112. The pixel region 111 is a pixel group in which a plurality of pixels are arranged in a matrix. The pixels in the pixel group perform photoelectric conversion of light from a subject. The pixel region 111 outputs pixel signals from the respective pixels as live view (LV) data or still image data to the read circuit 112.

The read circuit 112 reads the LV data or still image data from the pixel region 111. The LV data is image data for repeatedly displaying an LV image in the display unit 103. The still image data is image data captured as a result of a trigger (hereinafter, the imaging trigger) such as the depressing of a shutter release button or the elapsing of a time setting in a timer.

The read circuit 112 thins out prescribed pixel signals from the pixel group of the pixel region 111 to read the LV data when the imaging trigger has not been inputted, and reads the pixel signals from the pixel group of the pixel region 111 without thinning out if the imaging trigger has been inputted. The still image data may alternatively be thinned by the imaging element 101 but in such a case, the number of thinned pixels would be set to be less than for the LV data.

In Embodiment 1, an imaging state where LV data is repeatedly outputted without the input of the imaging trigger is referred to as the LV imaging state, and an imaging state where the imaging trigger has been inputted is referred to as the still image capture state.

The LV data is outputted from the read circuit 112 to an LV data processing unit 121 of the image processing unit 102, and the still image data is outputted to a still image data processing unit 122 of the image processing unit 102.

The image processing unit 102 has the LV data processing unit 121 and the still image data processing unit 122. The image processing unit 102 may specifically be realized by an integrated circuit such as a field-programmable gate array (FPGA), for example, or may be realized by a processor executing image processing programs stored in a memory.

The LV data processing unit 121 performs image processing on a sequence of LV data repeatedly outputted from the imaging element 101 and outputs the same to the display unit 103. Specifically, the LV data processing unit 121 executes generation of evaluation values for 3A (automatic exposure control (AE), auto white balance (AWB), and autofocus (AF)), developing, distortion correction, image resizing, and thinning, and adjusts the LV data so as to be displayable in the display unit 103, for example.

The still image data processing unit 122 performs image processing on the still data outputted from the imaging element 101 and stores the same in the recording medium 104. Specifically, the still data processing unit 122 executes generation of evaluation values for 3A, developing, distortion correction, and image resizing, and adjusts the still image data so as to be recordable in the recording medium 104.

Thus, the imaging device 100 executes dual pipeline processing in which the imaging element 101 outputs the LV data and the still image data in parallel and the image processing unit 102 performs image processing in parallel on the LV data and the still image data. This dual pipeline processing resolves the issue of blackouts in the LV data.

The display unit 103 displays the repeatedly outputted LV data. The display unit 103 specifically is a monitor provided on the rear surface of the imaging device 100 and/or an electronic viewfinder that can be viewed by the photographer's eye being directly against the viewfinder, for example.

The recording medium 104 is a memory that records the still image data. The recording medium 104 may be fixed to the imaging device 100 or be detachable therefrom. The still image data recorded in the recording medium 104 may be displayable in the display unit 103.

The imaging trigger output control unit 105 controls the timing at which the imaging trigger is outputted to the read circuit 112 on the basis of frame rate (FR) information, and outputs the imaging trigger to the read circuit 112. The frame rate information is the frame rate during exposure of the imaging element 101 and/or the frame rate during thinning. The imaging trigger output control unit 105 generates a timing signal 200 to be described later, and counts an ascending order number to be described later.

<Blackout-Free Live View Display Example>

Next, a blackout-free live view display example based on control of the output timing will be described in detail. In Embodiment 1, the frame rate during exposure of the imaging element 101 is 120 fps, and the frame rate during thinning for display in the display unit 103 is 60 fps.

Figure 2:
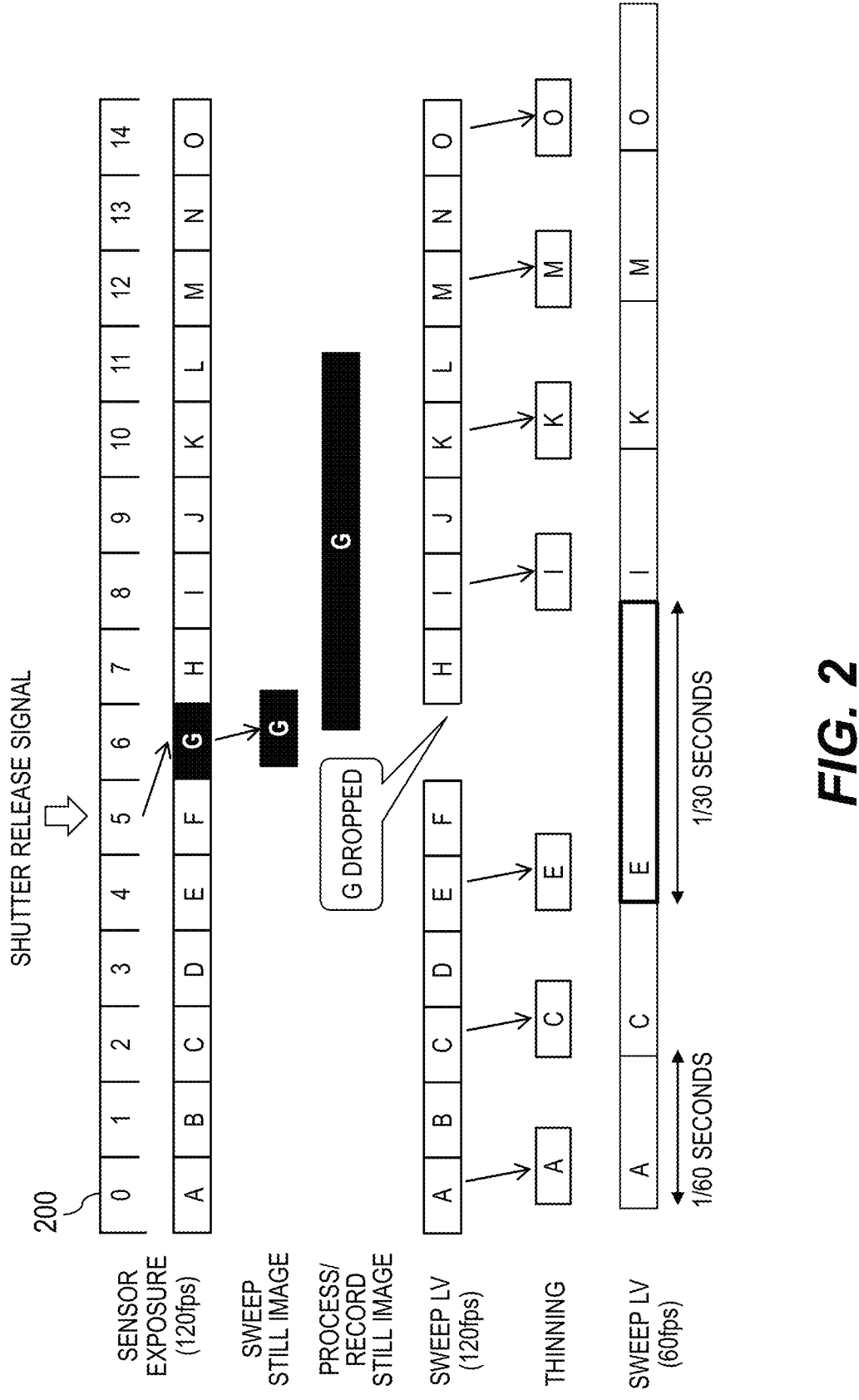
FIG. 2 is a descriptive drawing showing a blackout-free live view display example 1 of the imaging device according to Embodiment 1.

FIG. 2 is a descriptive drawing showing a blackout-free live view display example 1 of the imaging device 100 according to Embodiment 1. That is, in this example, the imaging trigger output control unit 105 is not included, or does not operate. The timing signal 200 oscillates at a given interval that depends on the frame rate during exposure of the imaging element 101.

The numbers #(in FIG. 2, #=0-14) of the pulses of the timing signal 200 are numbers (hereinafter, the ascending order numbers) indicating the ascending output order of the LV data. The time interval indicated by the number is the inverse of the frame rate during exposure of the imaging element 101, and is $\frac{1}{120}$ seconds in the present example.

The imaging element 101 repeatedly outputs the LV data at 120 fps by exposure. In Embodiment 1, the LV data is the frame A to the frame O. In an LV imaging state where a shutter release signal is not issued even once during the ascending order numbers 0-14, the LV data processing unit 121 thins frames A to O outputted at 120 fps from the imaging element 101 down to 60 fps, and outputs the non-thinned frames A, C, E, G, I, K, M, and O to the display unit 103. That is, the frames B, D, F, H, J, L, and N are thinned. The display unit 103 sequentially displays the non-thinned frames A, C, E, G, I, K, M, and O for $\frac{1}{60}$ second.

Here, the imaging trigger is the shutter release button being depressed at the timing of the ascending order number 5, for example and the read circuit 112 receiving the shutter release signal. In this case, the imaging element 101 outputs the frame G at the subsequent ascending order number 6 as still image data to the still image data processing unit 122.

The still image data processing unit 122 performs still image processing on the frame G and records the same in the recording medium 104. That the graphic for the frame G in the still image processing and recording is elongated in the horizontal direction indicates the length of time taken for still image processing and recording.

Thus, the frame G is the still image data, and therefore, the imaging element 101 outputs the LV data with the frame G omitted, or in other words, the frames A-F and H-O to the LV data processing unit 121.

The LV data processing unit 121 thins the LV data of the frames A-F and H-O, with the frame G removed, at 60 fps, and outputs the frames A, C, E, I, K, M, and O to the display unit 103. The display unit 103 displays the frames A, C, E, I, K, M, and O in the stated order, but while the display time for the frames A, C, I, K, M, and O is $\frac{1}{60}$ second, the display time for the frame E is $\frac{1}{30}$ second. This is because the frame G is dropped as LV data due to being acquired as the still image data, and thus, the time to display the frame E is extended until the timing that the frame I is displayed.

Figure 3:
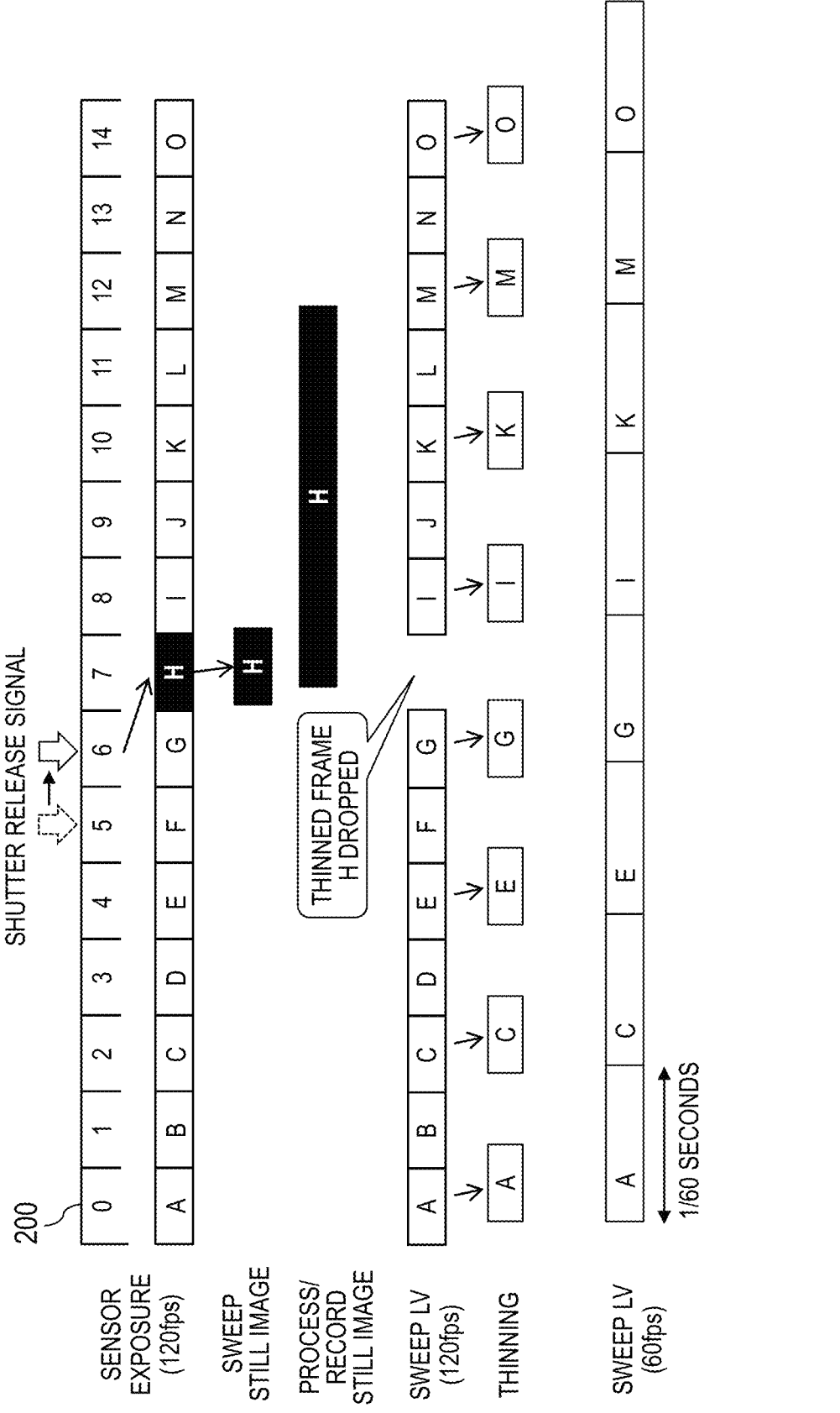
FIG. 3 is a descriptive drawing showing a blackout-free live view display example 2 of the imaging device according to Embodiment 1.

FIG. 3 is a descriptive drawing showing a blackout-free live view display example 2 of the imaging device 100 according to Embodiment 1. In FIG. 3, the imaging trigger is the imaging trigger output control unit 105 receiving the shutter release signal at the timing of the ascending order number 5. In this case, the imaging trigger output control unit 105 delays the output timing for the shutter release signal from depressing the shutter release button (ascending order number 5) to the timing of the ascending order number 6. As a result, instead of reading the frame G of the ascending order number 6, the read circuit 112 reads the frame H of the subsequent ascending order number 7 as the still image data and outputs the same to the still image data processing unit 122.

That is, if the frame rate during thinning is ½ the frame rate during exposure of the imaging element 101, then upon receiving input of the shutter release signal at the timing of the ascending order number 2n+1 (n being an integer of 0 or greater), the imaging trigger output control unit 105 outputs the shutter release signal to the read circuit 112 at the timing of the ascending order number 2n+2. As a result, the read circuit 112 reads the still image data from the pixel region 111 at the timing of the ascending order number 2n+3.

The still image data processing unit 122 performs still image processing on the frame H and records the same in the recording medium 104. That the graphic for the frame H in the still image processing and recording is elongated in the horizontal direction indicates the length of time taken for still image processing and recording.

Thus, the frame H is the still image data, and therefore, the imaging element 101 outputs the LV data with the frame H omitted, or in other words, the frames A-G and I-O to the LV data processing unit 121.

The LV data processing unit 121 thins the LV data of the frames A-G and I-O, with the removal of the frame H that was thinned during the thinning process, at 60 fps, and outputs the frames A, C, E, G, K, M, and O, which were not thinned, to the display unit 103. That is, the frames B, D, F, J, L, and N are thinned.

The display unit 103 sequentially displays the non-thinned frames A, C, E, G, K, M, and O for ⅟₆₀ second. In this manner, by controlling the read timing of the read circuit 112 such that the thinned frame H is the still image data, the display unit 103 can display the non-thinned frames A, C, E, G, K, M, and O at the same time interval (⅟₆₀ second).

Figure 4:
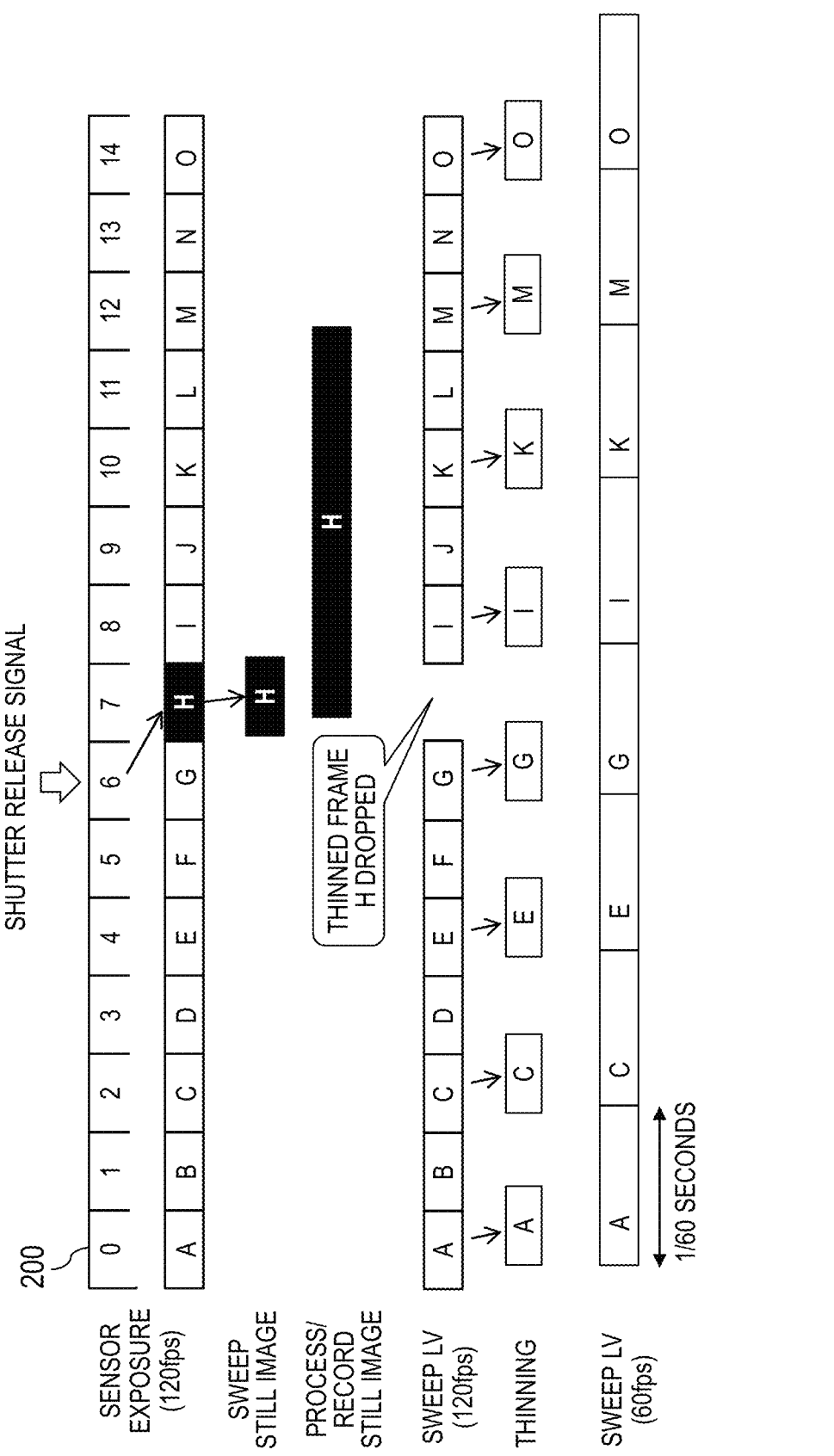
FIG. 4 is a descriptive drawing showing a blackout-free live view display example 3 of the imaging device according to Embodiment 1.

FIG. 4 is a descriptive drawing showing a blackout-free live view display example 3 of the imaging device 100 according to Embodiment 1. In FIG. 4, the imaging trigger is the imaging trigger output control unit 105 receiving the shutter release signal at the timing of the ascending order number 6. In this case, unlike in FIG. 3, the imaging trigger output control unit 105 delays the output timing for the shutter release signal from depressing the shutter release button (ascending order number 6). As a result, instead of reading the frame I of the ascending order number 8, the read circuit 112 reads the frame H of the ascending order number 7 subsequent to the ascending order number 6 as the still image data and outputs the same to the still image data processing unit 122.

That is, if the frame rate during thinning is ½ the frame rate during exposure of the imaging element 101, then upon receiving input of the shutter release signal at the timing of the ascending order number 2n, the imaging trigger output control unit 105 outputs the shutter release signal to the read circuit 112 at the timing of the ascending order number 2n.

As a result, the read circuit 112 reads the still image data from the pixel region 111 at the timing of the ascending order number 2n+1.

Thus, similar to FIG. 3, the frame H is the still image data, and therefore, the imaging element 101 outputs the LV data with the frame H omitted, or in other words, the frames A-G and I-O to the LV data processing unit 121. Therefore, similar to FIG. 2, the display unit 103 can display the non-thinned frames A, C, E, G, K, M, and O at the same time interval (⅟₆₀ second).

In Embodiment 1, the imaging device 100 may have a first selection unit 500 that can select, by user designation, between the operation indicated in FIG. 2 (the operation in which control by the imaging trigger output control unit 105 is not performed) and the operation indicated in FIG. 3 or 4 (the operation in which control by the imaging trigger output control unit 105 is performed). As a result, the user can use the imaging device 100 while switching between the operation indicated in FIG. 2 and the operation indicated in FIG. 3 or 4.

Embodiment 2

Embodiment 2 is a configuration of Embodiment 1 in which the frame rate during exposure of the imaging element 101 is 120 fps, and the frame rate during thinning for display in the display unit 103 is 40 fps. Descriptions of content that is the same as Embodiment 1 will be omitted.
<Blackout-Free Live View Display Example>

Figure 5:
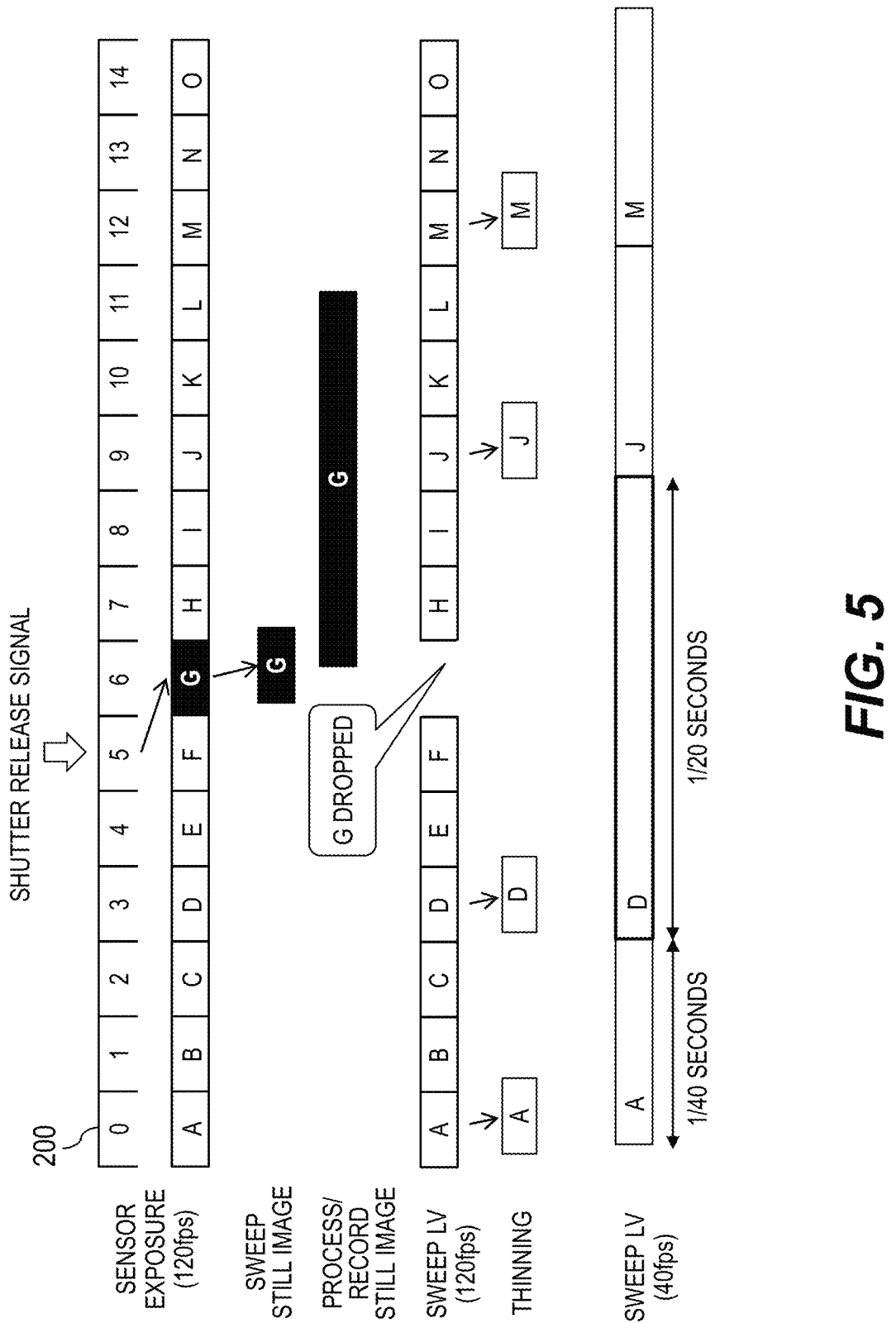
FIG. 5 is a descriptive drawing showing a blackout-free live view display example 1 of the imaging device according to Embodiment 2.

FIG. 5 is a descriptive drawing showing a blackout-free live view display example 1 of the imaging device 100 according to Embodiment 2. Similar to FIG. 2, FIG. 5 shows an example in which the imaging trigger output control unit 105 is not included, or does not operate.

The imaging element 101 repeatedly outputs the LV data at 120 fps by exposure. In an LV imaging state where a shutter release signal is not issued even once during the ascending order numbers 0-14, the LV data processing unit 121 thins frames A to O outputted at 120 fps from the imaging element 101 down to 40 fps, and outputs the frames A, D, E, G, J, and N to the display unit 103. The display unit 103 sequentially displays the frames A, D, E, G, J, and N for ⅟₄₀ second.

Here, the imaging trigger is the shutter release button being depressed at the timing of the ascending order number 5, for example and the read circuit 112 receiving the shutter release signal. In this case, the imaging element 101 outputs the frame G at the subsequent ascending order number 6 as still image data to the still image data processing unit 122.

The still image data processing unit 122 performs still image processing on the frame G and records the same in the recording medium 104. Thus, the frame G is the still image data, and therefore, the imaging element 101 outputs the LV data with the frame G omitted, or in other words, the frames A-F and H-O to the LV data processing unit 121.

The LV data processing unit 121 thins the LV data of the frames A-F and H-O, with the frame G removed, to 40 fps, and outputs the non-thinned frames A, D, J, and M to the display unit 103. That is, the frames B, C, E, F, H, I, K, L, N, and O are thinned.

The display unit 103 displays the non-thinned frames A, D, J, and M in the stated order, but while the display time for the frames A, J, and M is ⅟₄₀ second, the display time for the frame D is ⅟₂₀ second. This is because the frame G is dropped as LV data due to being acquired as the still image data, and thus, the time to display the frame E is extended until the timing that the frame J is displayed.

Figure 6:
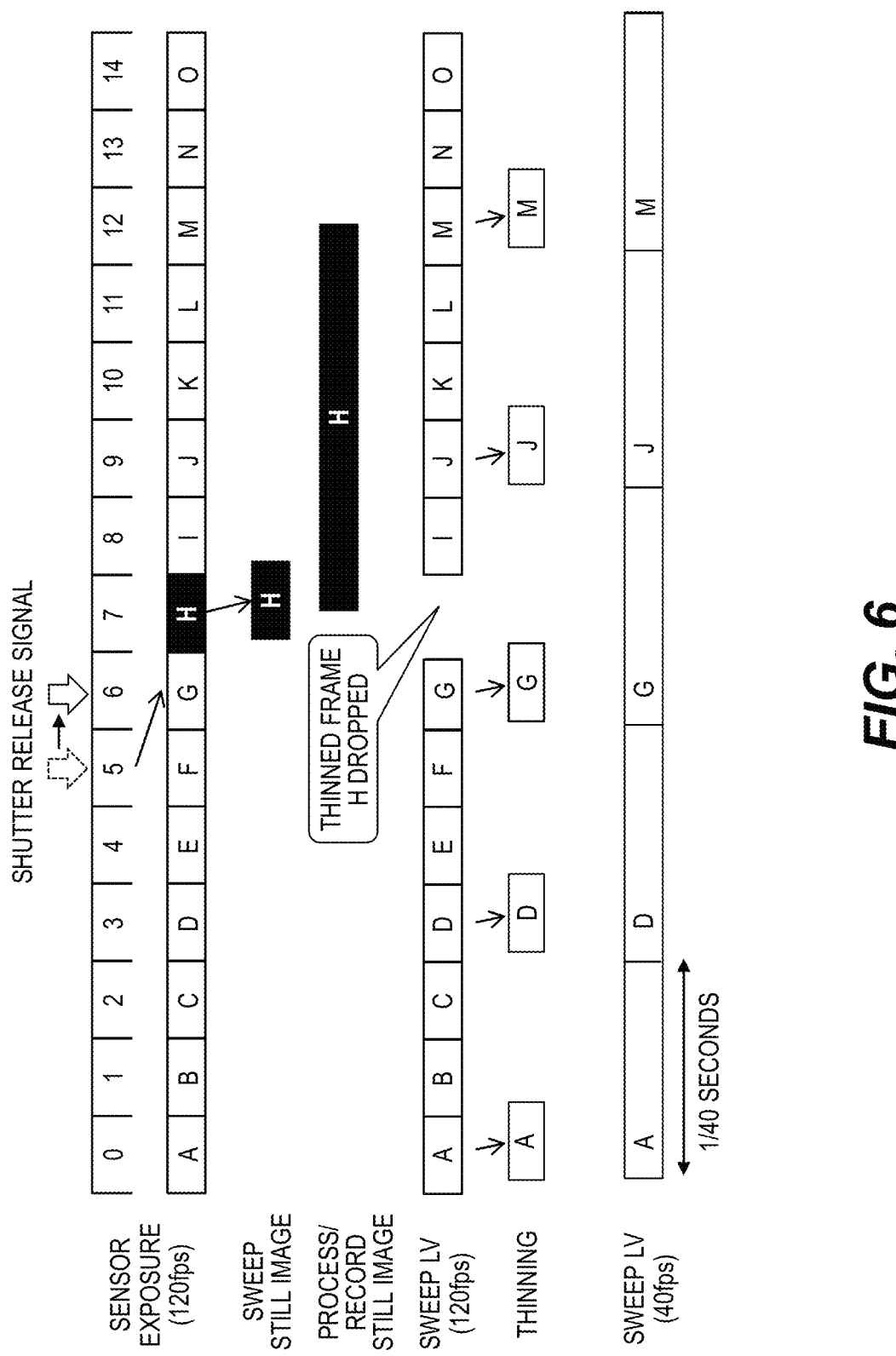
FIG. 6 is a descriptive drawing showing a blackout-free live view display example 2 of the imaging device according to Embodiment 2.

FIG. 6 is a descriptive drawing showing a blackout-free live view display example 2 of the imaging device 100 according to Embodiment 2. In FIG. 6, the imaging trigger is the imaging trigger output control unit 105 receiving the shutter release signal at the timing of the ascending order number 5. In this case, the imaging trigger output control unit 105 delays the output timing for the shutter release signal from depressing the shutter release button (ascending order number 5) to the timing of the ascending order number 6. As a result, instead of reading the frame G of the ascending order number 6, the read circuit 112 reads the frame H of the subsequent ascending order number 7 as the still image data and outputs the same to the still image data processing unit 122.

That is, if the frame rate during thinning is $\frac{1}{3}$ the frame rate during exposure of the imaging element 101, then upon receiving input of the shutter release signal at the timing of the ascending order number $\{2+3(n-1)\}$ (n being an integer of 1 or greater), the imaging trigger output control unit 105 outputs the shutter release signal to the read circuit 112 at the timing of the ascending order number $\{3+3(n-1)\}$. As a result, the read circuit 112 reads the still image data from the pixel region 111 at the timing of the ascending order number $\{4+3(n-1)\}$.

The still image data processing unit 122 performs still image processing on the frame H and records the same in the recording medium 104. The LV data processing unit 121 thins the LV data of the frames A-G and I-O, with the removal of the frame H that was thinned during the thinning process, to 40 fps, and outputs the non-thinned frames A, D, G, J, and M, which were not thinned, to the display unit 103.

That is, the frames B, C, E, F, I, K, L, N, and O are thinned. The display unit 103 sequentially displays the non-thinned frames A, D, G, J, and M for $\frac{1}{40}$ second. In this manner, by controlling the read timing of the read circuit 112 such that the thinned frame H is the still image data, the display unit 103 can display the frames A, D, G, J, and M at the same time interval ($\frac{1}{40}$ second).

Figure 7:
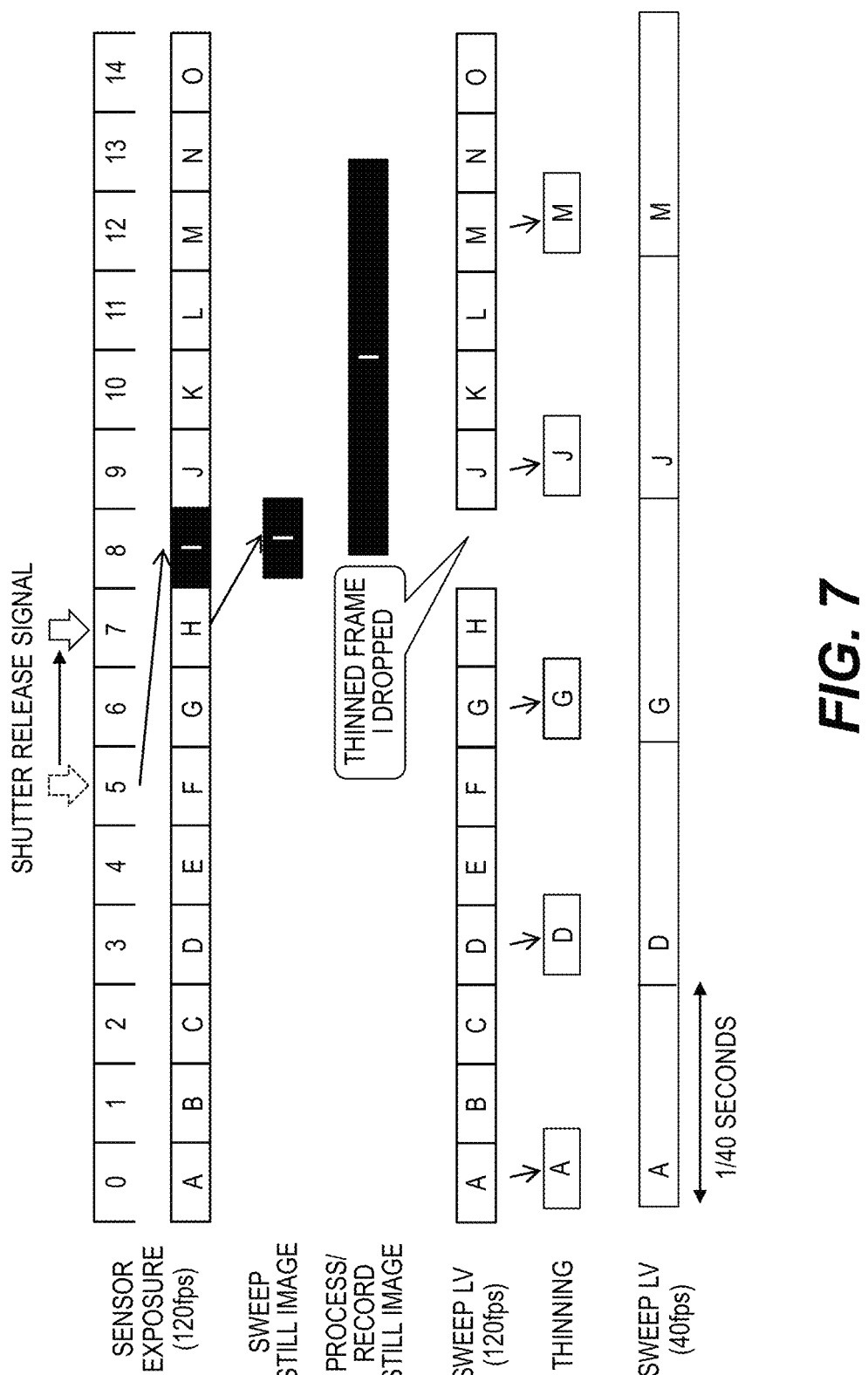
FIG. 7 is a descriptive drawing showing a blackout-free live view display example 3 of the imaging device according to Embodiment 2.

FIG. 7 is a descriptive drawing showing a blackout-free live view display example 3 of the imaging device 100 according to Embodiment 2. In FIG. 7, the imaging trigger is the imaging trigger output control unit 105 receiving the shutter release signal at the timing of the ascending order number 5. In this case, the imaging trigger output control unit 105 delays the output timing for the shutter release signal from depressing the shutter release button (ascending order number 5) to the timing of the ascending order number 7. As a result, instead of reading the frame G of the ascending order number 6, the read circuit 112 reads the frame I of the next to subsequent ascending order number 8 as the still image data and outputs the same to the still image data processing unit 122.

That is, if the frame rate during thinning is $\frac{1}{3}$ the frame rate during exposure of the imaging element 101, then upon receiving input of the shutter release signal at the timing of the ascending order number $\{2+3(n-1)\}$ (n being an integer of 1 or greater), the imaging trigger output control unit 105 outputs the shutter release signal to the read circuit 112 at the timing of the ascending order number $\{4+3(n-1)\}$. As a result, the read circuit 112 reads the still image data from the pixel region 111 at the timing of the ascending order number $\{5+3(n-1)\}$.

The still image data processing unit 122 performs still image processing on the frame I and records the same in the recording medium 104. The LV data processing unit 121 thins the LV data of the frames A-H and J-O, with the removal of the frame I that was thinned during the thinning process, to 40 fps, and outputs the non-thinned frames A, D, G, J, and M, which were not thinned, to the display unit 103.

That is, the frames B, C, E, F, H, K, L, N, and O are thinned. The display unit 103 sequentially displays the non-thinned frames A, D, G, J, and M for $\frac{1}{40}$ second. In this manner, by controlling the read timing of the read circuit 112 such that the thinned frame H is the still image data, the display unit 103 can display the frames A, D, G, J, and M at the same time interval ($\frac{1}{40}$ second).

As described above, upon receiving the shutter release signal at the timing of the ascending order number 5, the imaging trigger output control unit 105 can output at the timing of either the ascending order number 6 or the ascending order number 7, but if reducing the offset between the shutter release timing and the read timing of the still image data to the greatest extent possible, the imaging trigger output control unit 105 should delay from the ascending order number 5 to the ascending order number 6 in outputting to the read circuit 112 as indicated in FIG. 6.

Also, in Embodiment 2, the imaging device 100 may have a first selection unit 500 that can select, by user designation, between the operation indicated in FIG. 5 (the operation in which control by the imaging trigger output control unit 105 is not performed) and the operation indicated in FIG. 6 or 7 (the operation in which control by the imaging trigger output control unit 105 is performed). As a result, the user can use the imaging device 100 while switching between the operation indicated in FIG. 5 and the operation indicated in FIG. 6 or 7.

Embodiment 3

Next, Embodiment 3 will be described. Embodiment 3 is an example in which extension is avoided in the live view display by a method differing from Embodiments 1 and 2. Descriptions of content that is the same as Embodiments 1 and 2 will be omitted.

<Configuration Example of Imaging Device 100>

Figure 8:
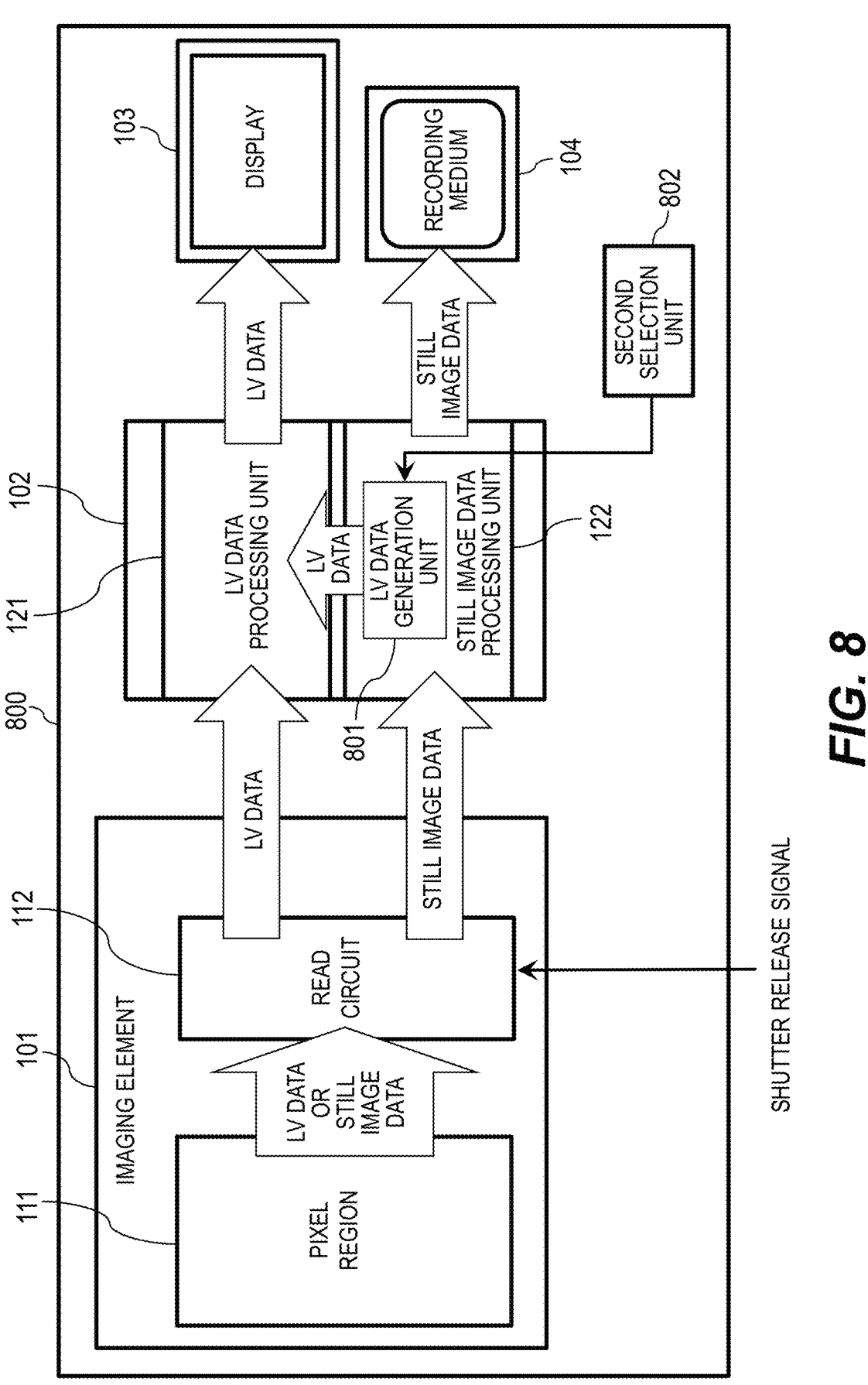
FIG. 8 is a block diagram showing a configuration example of an imaging device according to Embodiment 3.

FIG. 8 is a block diagram showing a configuration example of an imaging device 800 according to Embodiment 3. The difference from Embodiment 1 is the feature in which the still image data processing unit 122 has an LV data generation unit 801 and does not have the imaging trigger output control unit 105. The LV data generation unit 801 thins the still image data in a manner similar to that performed by the read circuit 112 in thinning and reading LV data from the pixel region 111, and generates LV data. The LV data processing unit 121 outputs the LV data generated by the LV data generation unit to the display unit 103.

<Blackout-Free Live View Display Example>

Figure 9:
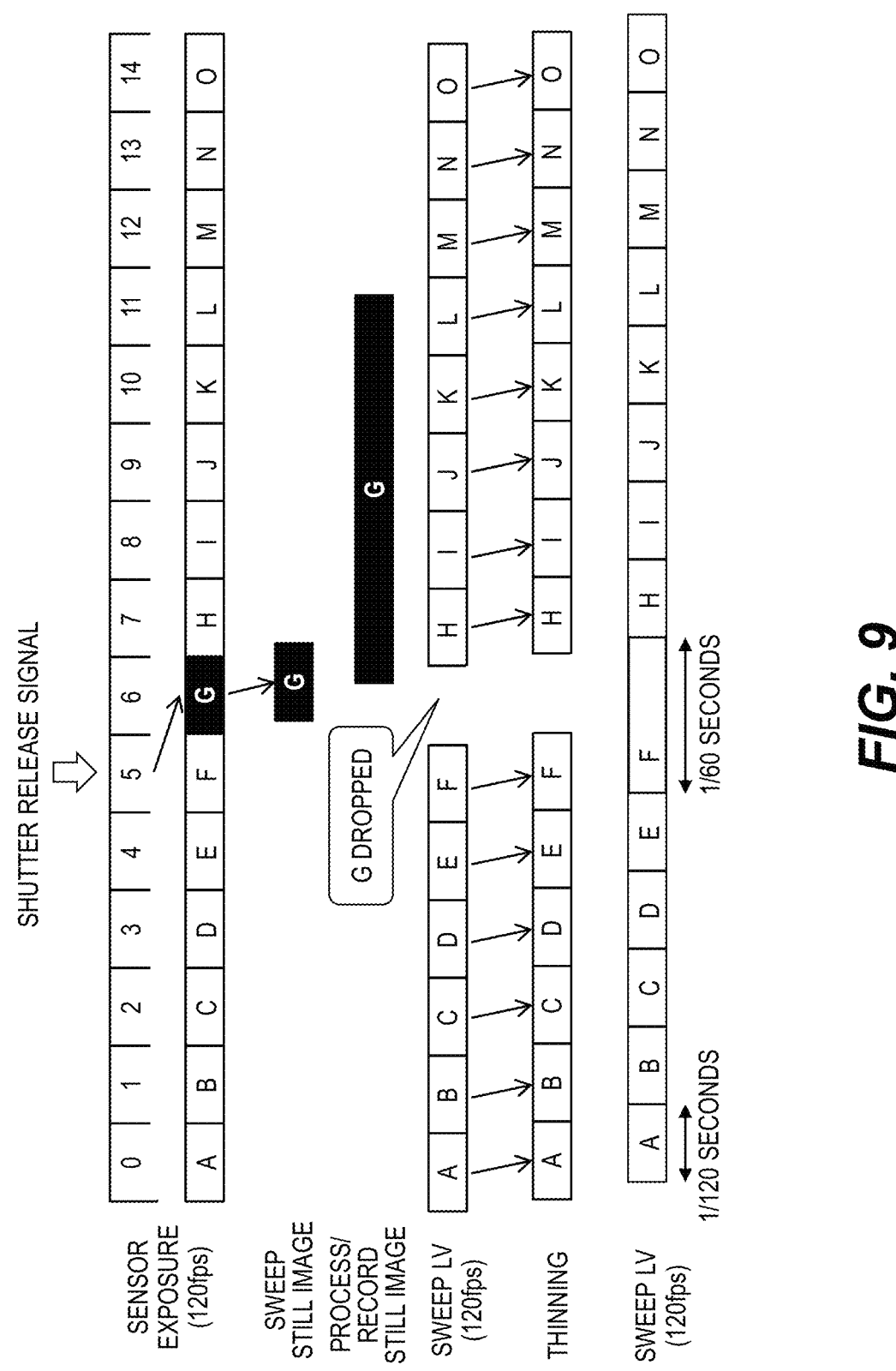
FIG. 9 is a descriptive drawing showing a blackout-free live view display example 1 of the imaging device according to Embodiment 3.

FIG. 9 is a descriptive drawing showing a blackout-free live view display example 1 of the imaging device 800 according to Embodiment 3. In FIG. 9, the frame rate during exposure of the imaging element 101 is 120 fps, and the frame rate of the image displayed in the display unit 103 is 120 fps. In FIG. 9, the LV data generation unit 801 does not operate.

In FIG. 9, the imaging trigger is the read circuit 112 receiving the shutter release signal at the timing of the ascending order number 5. In this case, the read circuit 112 reads the frame G of the ascending order number 6 subsequent to the received ascending order number 5 as the still image data and outputs the same to the still image data processing unit 122.

The still image data processing unit 122 performs still image processing on the frame G and records the same in the recording medium 104. Thus, the frame G is the still image data, and therefore, the imaging element 101 outputs the LV data with the frame G omitted, or in other words, the frames A-F and H-O to the LV data processing unit 121.

Without thinning the LV data of the frames A-F and H-O, with the frame G removed, the LV data processing unit 121 outputs the frames A-F and H-O to the display unit 103. The display unit 103 displays the frames A-F and H-O in the stated order, but while the display time for the frames A-E and H-O is ¹⁄₁₂₀ second, the display time for the frame F is ¹⁄₆₀ second. This is because the frame G is dropped as LV data due to being acquired as the still image data, and thus, the time to display the frame F is extended until the timing that the frame H is displayed.

Figure 10:
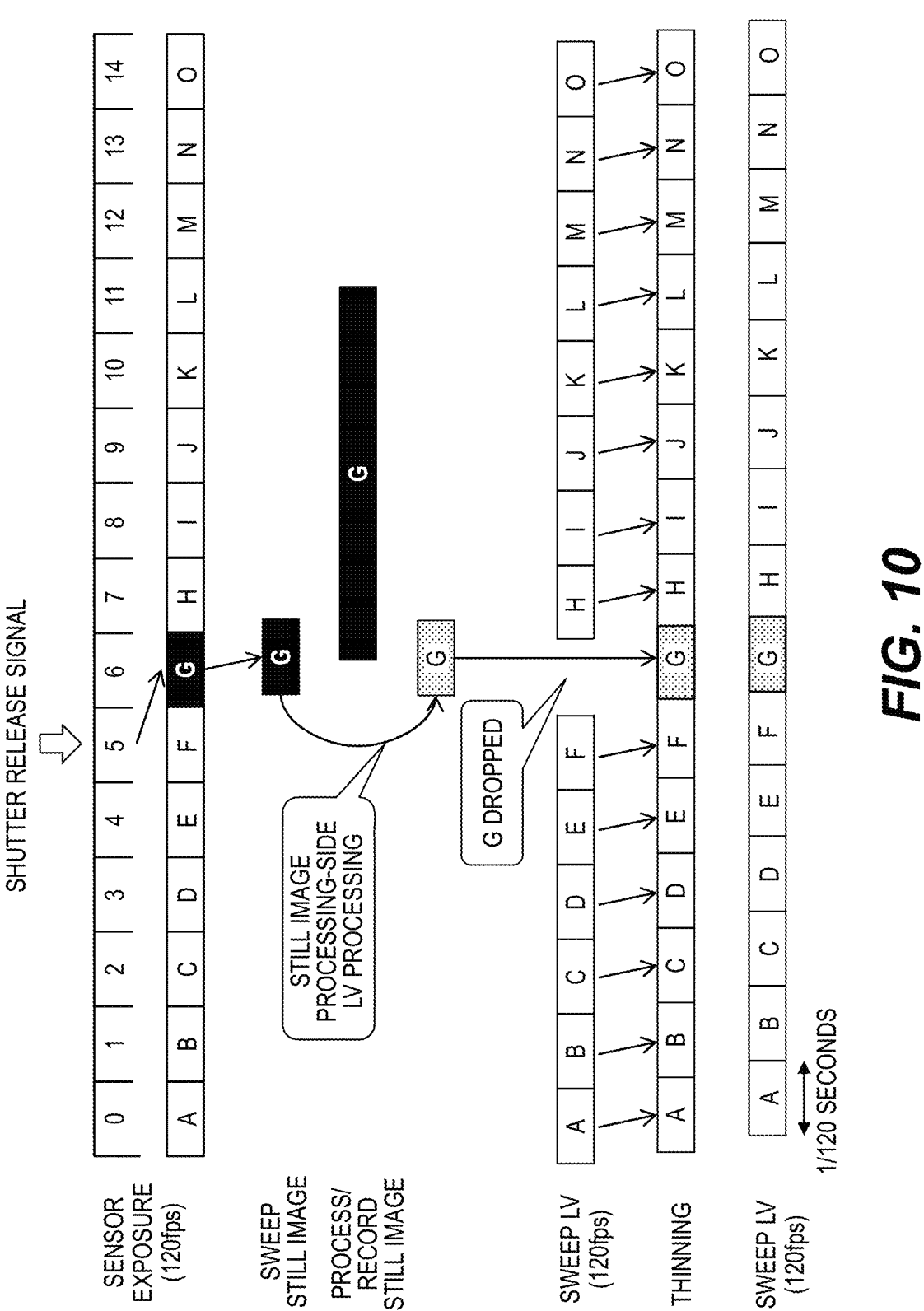
FIG. 10 is a descriptive drawing showing a blackout-free live view display example 2 of the imaging device according to Embodiment 3.

FIG. 10 is a descriptive drawing showing a blackout-free live view display example 2 of the imaging device 800 according to Embodiment 3. FIG. 10 is an example in which the LV data generation unit 801 operates. The difference from FIG. 9 is that the LV data generation unit 801 generates the LV data from the still image data of the frame G outputted from the imaging element 101. The generated LV data is handed over to the LV data processing unit 121.

The LV data processing unit 121 sequentially outputs the LV data starting with the frame A to the display unit 103, and after outputting the frame F, outputs the frame G generated by the LV data generation unit 801, and subsequently outputs the frames F-O. Thus, the display unit 103 can display the frames A-O at the same time interval (¹⁄₁₂₀ second).

Figure 11:
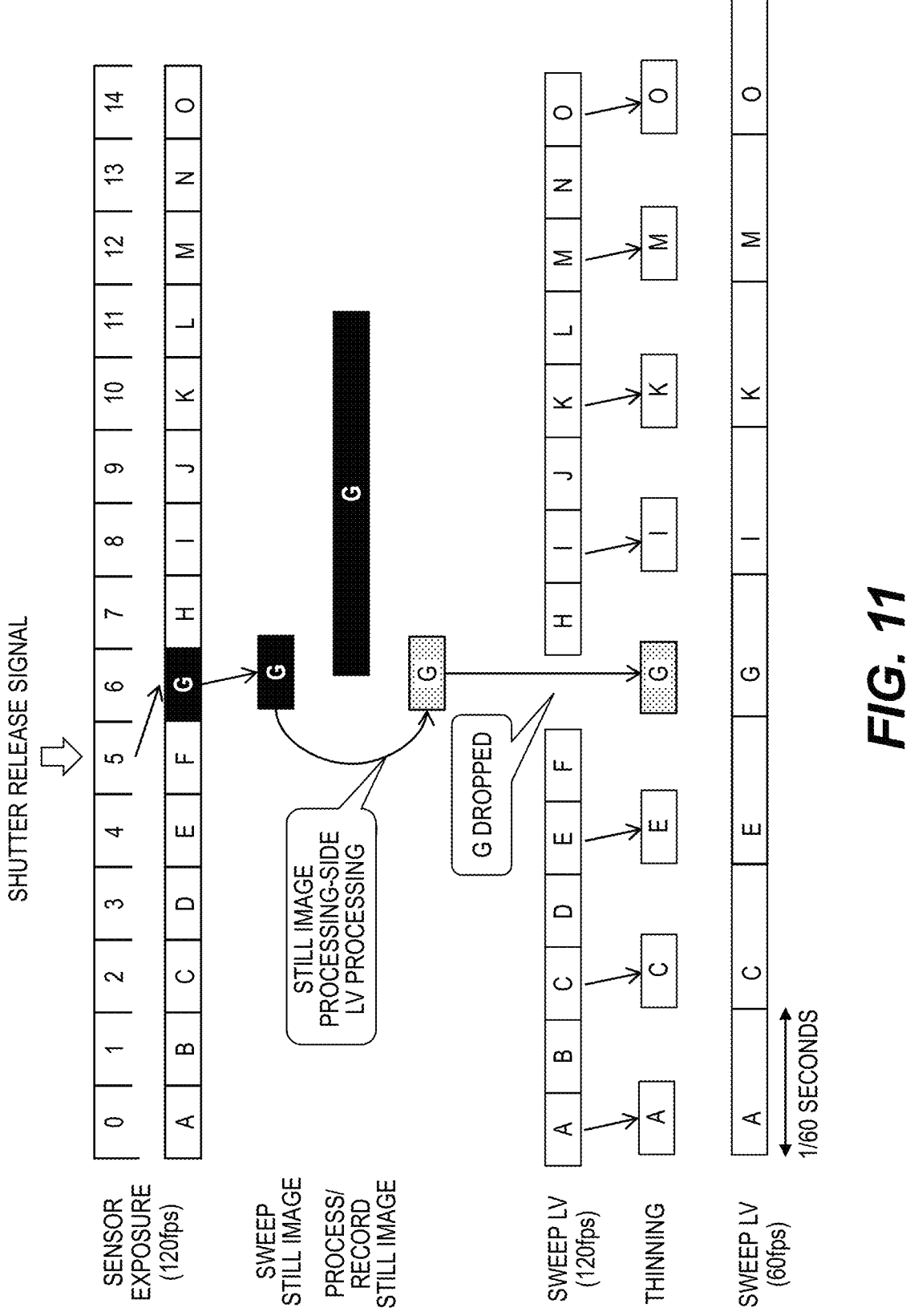
FIG. 11 is a descriptive drawing showing a blackout-free live view display example 3 of the imaging device according to Embodiment 3.

FIG. 11 is a descriptive drawing showing a blackout-free live view display example 3 of the imaging device 800 according to Embodiment 3. In FIG. 10, the frame rate for display in the display unit 103 is set to 120 fps, whereas in FIG. 11, the frame rate during exposure of the imaging element 101 is 120 fps, and the frame rate of the image displayed in the display unit 103 is 60 fps.

Similar to FIG. 10, FIG. 11 is an example in which the LV data generation unit 801 operates. The LV data processing unit 121 thins the LV data of the frames A-F and H-O at 60 fps, and outputs the frames A, C, E, G, I, K, M, and O, which were not thinned, to the display unit 103. That is, the frames B, D, F, H, J, L, and N are thinned.

The LV data processing unit 121 sequentially outputs the LV data starting with the non-thinned frame A to the display unit 103, and after outputting the non-thinned frame E, outputs the frame G generated by the LV data generation unit 801, and subsequently outputs the non-thinned frames I, K, M, and O. Thus, the display unit 103 can display the frames A, C, E, G, I, K, M, and O at the same time interval (¹⁄₆₀ second).

Figure 12:
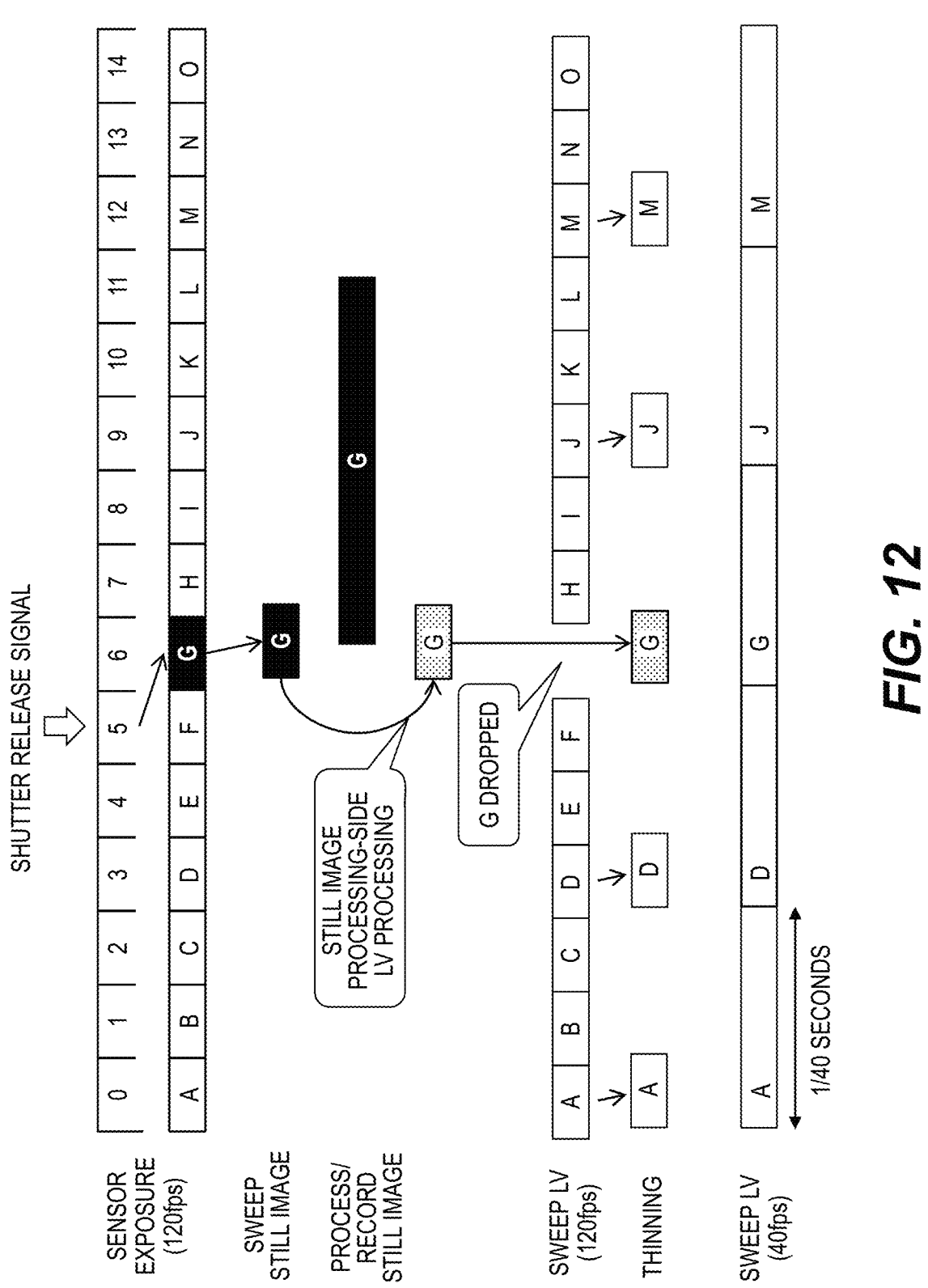
FIG. 12 is a descriptive drawing showing a blackout-free live view display example 4 of the imaging device according to Embodiment 3.

FIG. 12 is a descriptive drawing showing a blackout-free live view display example 4 of the imaging device 800 according to Embodiment 3. In FIG. 10, the frame rate for display in the display unit 103 is set to 120 fps, whereas in FIG. 12, the frame rate during exposure of the imaging element 101 is 120 fps, and the frame rate of the image displayed in the display unit 103 is 40 fps.

Similar to FIGS. 10 and 11, FIG. 12 is an example in which the LV data generation unit 801 operates. The LV data processing unit 121 thins the LV data of the frames A-F and H-O at 40 fps, and outputs the frames A, D, J, and N, to the display unit 103. The LV data processing unit 121 sequentially outputs the LV data starting with the non-thinned frame A to the display unit 103, and after outputting the non-thinned frame D, outputs the frame G generated by the LV data generation unit 801, and subsequently outputs the non-thinned frames J and N. Thus, the display unit 103 can display the frames A, D, G, J, and N at the same time interval (¹⁄₄₀ second).

In Embodiment 3, the imaging device 800 may have a second selection unit 802 that can select, by user designation, between the operation indicated in FIG. 9 (the LV data generation unit 801 does not execute operations) and the operation indicated in FIG. 10, 11, or 12 (the LV data generation unit 801 executes operations). As a result, the user can use the imaging device 800 while switching between the operation indicated in FIG. 9 and the operation indicated in FIG. 10, 11, or 12.

Also, the imaging device 800 of Embodiment 3 may be configured so as to be able to execute the operations of Embodiment 1 or 2. Specifically, the imaging device 800 of Embodiment 3 has the imaging trigger output control unit 105 and the first selection unit 500, for example. As a result, the imaging device 800 selects, using the above-mentioned selection unit, either the operation mode indicated in FIGS. 9 to 12 or the operation mode indicated in FIGS. 2 to 7. As a result, the user can switch between the operations of Embodiments 1 to 3.

Thus, according to Embodiments 1 to 3, it is possible to realize a live view display by which each piece of LV data can be displayed at the same time interval in a blackout-free manner. As a result, display is controlled such that the subject in the extended frame in the live view instantaneously moves in the subsequent frame.

In the imaging device 100 of Embodiments 1 and 2, the imaging trigger output control unit 105 outputs the shutter release signal to the read circuit 112 while controlling the output timing thereof on the basis of the frame rate during thinning, but the shutter release signal may be outputted to the read circuit 112 while controlling the output timing thereof on the basis of the frame rate during exposure of the imaging element 101.

Specifically, the imaging trigger output control unit 105 has the function of calculating the frame rate during thinning by multiplying the frame rate during exposure by 1/K (K can be set by the user to any integer value greater than or equal to 1), for example. Once the frame rate during exposure is set, the imaging trigger output control unit 105 calculates the frame rate during thinning by multiplying the frame rate during exposure by 1/K, and outputs the shutter release signal to the read circuit 112 by controlling the output timing thereof at the calculated frame rate.

In Embodiments 1 to 3, examples were given of the imaging devices 100 and 800 having incorporated therein the imaging element 101, but the imaging element 101 may be configured so as to be detachable from the imaging devices 100 and 800.

Remaining portions of the imaging devices 100 and 800 after removal of the imaging element 101 constitute the image processing device that can be connected to the imaging element 101 in a manner enabling communication therewith. In Embodiments 1 and 2, the imaging trigger output control unit 105 is provided outside of the imaging element 101 but may be installed in the imaging element 101.

The present invention is not limited to the content above, and the content above may be freely combined. Also, other aspects considered to be within the scope of the technical concept of the present invention are included in the scope of the present invention.

DESCRIPTION OF REFERENCE CHARACTERS

100, 800 imaging device
101 imaging element

102 image processing unit
103 display unit
104 recording medium
105 imaging trigger output control unit
111 pixel region
112 read circuit
121 LV data processing unit
122 still image data processing unit
200 timing signal
500 first selection unit
801 LV data generation unit
802 second selection unit

What is claimed is:

1. An imaging device, comprising:
an imaging element configured to output a sequence of first frames at a first interval through first image capture, and output a second frame through an instruction for second image capture; and
a processor that is configured to:
    perform thinning of the sequence of first frames and outputs the thinned first frames at a second interval; and
    control an output timing of the second frame on the basis of the first interval or the second interval and an instruction timing for the second image capture,
wherein, if the output timing of the second frame is an output timing of the thinned first frames where output is performed at the second interval, then the processor is configured to control the imaging element so as to output the second frame during the second interval.

2. The imaging device according to claim 1,
wherein, if the first interval is shorter than the second interval, then the processor is configured to thin the sequence of first frames.

3. The imaging device according to claim 1, further comprising:
a display configured to display the thinned first frames outputted at the second interval.

4. The imaging device according to claim 1,
wherein the second imaging is imaging performed by depressing a shutter release button.

5. The imaging device according to claim 1, wherein the processor is further configured to:
select a first setting of controlling an output timing of the second frame or a second setting of not controlling the output timing of the second frame,
perform control according to the setting selected.

6. The imaging device according to claim 1, wherein the processor is further configured to:
generate a third frame by thinning the second frame;
control an output timing of the third frame generated at a timing in which the first frames are not outputted at the first interval due to the instruction for the second image capture.

7. The imaging device according to claim 6,
wherein processor is configured to output the third frame after the first frame outputted from the imaging element immediately prior to the second frame and before the first frame outputted from the imaging element immediately after the second frame.

8. The imaging device according to claim 7,
wherein the processor is configured to output the third frame at a timing in which the first frames are not outputted at the second interval due to the thinning.

9. The imaging device according to claim 8,
wherein the processor is configured not to output the third frame at a timing in which the first frames are outputted at the second interval due to the thinning.

10. The imaging device according to claim 1, further comprising:
a image processing circuit configured to process image data outputted from the imaging element;
wherein the imaging element is configured to output data related to the first frame and data related to the second frame to the image processing circuit.

11. The imaging device according to claim 10,
wherein the image processing circuit comprises a first processing circuit configured to process to the data related to the first frame and a second processing circuit configured to process to the data related to the second frame.

12. The imaging device according to claim 11,
wherein the imaging element comprises a first output circuit configured to output to the data related to the first frame to the first processing circuit and a second output circuit configured to output to the data related to the second frame to the second processing circuit.

13. The imaging device according to claim 12,
wherein the second output circuit is configured to output to the data related to the second frame to the second processing circuit, when the first output circuit outputs to the data related to the first frame to the first processing circuit.

\* \* \* \* \*